US012001031B2

(12) United States Patent
Takeuchi et al.

(10) Patent No.: US 12,001,031 B2
(45) Date of Patent: Jun. 4, 2024

(54) INPUT DEVICE AND INFORMATION PROCESSING DEVICE

(71) Applicant: NIDEC SANKYO CORPORATION, Nagano (JP)

(72) Inventors: Junro Takeuchi, Nagano (JP); Shinya Miyazawa, Nagano (JP); Yosuke Oguchi, Nagano (JP); Masaya Fujimoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 18/016,927

(22) PCT Filed: May 31, 2021

(86) PCT No.: PCT/JP2021/020744
§ 371 (c)(1),
(2) Date: Jan. 19, 2023

(87) PCT Pub. No.: WO2022/018973
PCT Pub. Date: Jan. 27, 2022

(65) Prior Publication Data
US 2023/0351804 A1    Nov. 2, 2023

Related U.S. Application Data

(60) Provisional application No. 63/054,799, filed on Jul. 22, 2020.

(51) Int. Cl.
*G02B 30/56* (2020.01)
*G06F 3/041* (2006.01)
(Continued)

(52) U.S. Cl.
CPC ............. *G02B 30/56* (2020.01); *G06F 3/041* (2013.01); *G06F 21/602* (2013.01);
(Continued)

(58) Field of Classification Search
CPC .. G06F 3/041–0489; G02B 30/56; G02B 5/32
See application file for complete search history.

(56) References Cited

U.S. PATENT DOCUMENTS 5,949,348 A * 9/1999 Kapp .................... G07F 7/1041
340/5.4
9,531,689 B1 * 12/2016 Romero-Mariona ........................
H04L 63/0428
(Continued)

FOREIGN PATENT DOCUMENTS

JP    2002236944 A    8/2002
JP    2003067337 A    3/2003
(Continued)

OTHER PUBLICATIONS

International Search Report for International Application No. PCT/JP2021/020744, dated Aug. 10, 2021.

*Primary Examiner* — Amy Onyekaba
(74) *Attorney, Agent, or Firm* — CANTOR COLBURN LLP

(57) ABSTRACT

An input device includes a control portion for controlling the input device encrypts image data, which is data of an image displayed on a display surface of a display mechanism, and transmits it to the display mechanism, and a detection mechanism for detecting a position of the user's fingertip in an aerial-image display region encrypts position data, which is data of a detected position of the user's fingertip, and transmits it to the control portion. In addition, in this input device, at least a fraud against a position-data signal line which transmits the position data from the detection mechanism to a control board and a fraud against the control board can be detected by a fraud detection mechanism for detecting that a fraud against the input device.

8 Claims, 6 Drawing Sheets

(51) Int. Cl.
*G06F 21/60* (2013.01)
*G06F 21/62* (2013.01)
*G06F 21/83* (2013.01)
*G06V 40/16* (2022.01)

(52) U.S. Cl.
CPC .......... *G06F 21/6245* (2013.01); *G06F 21/83* (2013.01); *G06V 40/172* (2022.01)

(56) References Cited

U.S. PATENT DOCUMENTS

| | | | | |
|---|---|---|---|---|
| 2003/0044013 | A1* | 3/2003 | Mukogawa | G07F 7/10 380/255 |
| 2004/0113819 | A1* | 6/2004 | Gauthey | G06F 21/83 340/5.51 |
| 2013/0020389 | A1* | 1/2013 | Barnett | H04W 12/02 235/380 |
| 2013/0305392 | A1* | 11/2013 | Bar-El | H04L 63/0823 726/29 |
| 2015/0077399 | A1* | 3/2015 | Nishioka | G06F 3/04815 345/175 |
| 2018/0145827 | A1* | 5/2018 | Pitel | G06F 21/14 |
| 2019/0235643 | A1* | 8/2019 | Kuribayashi | G06F 3/017 |
| 2019/0235737 | A1* | 8/2019 | Kuribayashi | G02B 30/56 |
| 2020/0134239 | A1* | 4/2020 | Inagaki | G06F 3/013 |
| 2020/0356324 | A1* | 11/2020 | Segarra, Jr. | G06F 3/1253 |

FOREIGN PATENT DOCUMENTS

| | | | |
|---|---|---|---|
| JP | 2018170422 A | | 11/2018 |
| JP | 2018197980 A | | 12/2018 |
| JP | 2019109636 A | * | 7/2019 |
| JP | 2019109636 A | | 7/2019 |
| JP | 2020134843 A | | 8/2020 |

* cited by examiner

INPUT DEVICE AND INFORMATION PROCESSING DEVICE

CROSS REFERENCE TO RELATED APPLICATIONS

This is the U.S. national stage of application No. PCT/JP2021/020744, filed on May 31, 2021. Priority under 35 U.S.C. § 119(e) is claimed from U.S. Provisional Application No. 63/054,799, filed Jul. 22, 2020, the disclosure of which is also incorporated herein by reference.

TECHNICAL FIELD

The present invention relates to an input device for users to input information using their fingertips. The invention also relates to an information processing device including such input device.

BACKGROUND ART

Conventionally, automated transaction devices such as ATMs (Automated Teller Machines) including an aerial-image display device and a PIN display and input portion are known (see, Patent Literature 1, for example). In the automated transaction device described in Patent Literature 1, the aerial-image display device includes an aerial-image forming mechanism and a display portion. The PIN display and input portion includes a PIN display portion and a PIN input portion. On the display portion, a keypad for inputting the PIN is displayed. The aerial-image forming mechanism projects the keypad displayed on the display portion into a space so as to form an aerial image and to display it on the PIN display portion.

In the automated transaction device in Patent Literature 1, the PIN input portion includes a detection mechanism which detects an operation performed by the user on the aerial image of the keypad displayed in the PIN display portion. The detection mechanism is, for example, an infrared sensor, a camera or the like that detects a position of the user's fingertip in a plane containing the aerial image of the keypad displayed in the PIN display portion. In the automated transaction device of Patent Literature 1, the PIN is input on the basis of a detection result of the detection mechanism by the user moving his/her fingertip sequentially to a predetermined position of the aerial image of the keypad displayed in the PIN display portion.

CITATION LIST

Patent Literature

[Patent Literature 1] Japanese Unexamined Patent Application Publication 2020-134843

SUMMARY OF THE INVENTION

Problems to be Solved by the Invention

The inventor of this application has developed an input device for users to input information such as PINs using an aerial image displayed in a space, as in the automated transaction device described in the Patent Literature 1. In this input device, it is preferable that a high level of security is ensured to prevent illegal acquisition of information such as the input PIN or the like by a third party. For example, in this input device, it is preferable that a high level of security compliant with PCIPTS (Payment Card Industry Pin Transaction Security), which is a security standard for secure handling of credit cards is ensured.

Therefore, an object of the present invention is, in an input device for a user to input information such as a PIN or the like by using an aerial image displayed in an aerial-image display region, to provide an input device which can ensure a high level of security. Moreover, an object of the present invention is to provide an information processing device including such input device.

Means for Solving the Problem

In order to solve the above problem, an input device of an aspect of the present invention is an input device inputting information by using a user's fingertip, characterized by including a display mechanism having a display surface which displays an image, an aerial-image forming mechanism which projects the image displayed on the display surface into a space to form an image as an aerial image, a detection mechanism detecting a position of the user's fingertip in an aerial-image display region, which is a region in which the aerial image is displayed, a control board having a control portion controlling the input device, and a fraud detection mechanism detecting that a fraud was committed against the input device, in which the aerial-image display region is an input portion inputting information, he control portion encrypts image data, which is data of the image displayed on the display surface, and transmits it to the display mechanism, and the detection mechanism encrypts position data, which is data of a detected position of the user's fingertip, and transmits it to the control portion, and at least a fraud against a position-data signal line which transmits the position data from the detection mechanism to the control board and a fraud against the control board can be detected by the fraud detection mechanism.

In the input device of this aspect, the control portion controlling the input device encrypts image data, which is data of the image displayed on the display surface of the display mechanism, and transmits it to the display mechanism, and the detection mechanism detecting a position of the user's fingertip in the aerial-image display region encrypts position data, which is data of the detected position of the user's fingertip, and transmits it to the control portion. Therefore, in this aspect, illegal acquisition of the image data transmitted from the control portion to the display mechanism and the position data transmitted from the detection mechanism to the control portion can be prevented.

In addition, in this aspect, the fraud detection mechanism detecting a fraud against the input device can detect at least a fraud against the position-data signal line which transmits the position data from the detection mechanism to the control board and a fraud against the control board. Thus, in this aspect, when a fraud was committed, predetermined processing can be executed on the basis of a detection result of the fraud detection mechanism so that the position data or the like is not illegally acquired. Therefore, in this aspect, a high level of security compliant with PCIPTS, for example, can be ensured for the input device.

In this aspect, it is preferable that the fraud detection mechanism includes a breakage detection circuit for detecting at least either one of disconnection and a short circuit of itself, and the breakage detection circuit covers at least a part of the position-data signal line. By configuring as above, if an attempt is made to illegally acquire the position data from the position-data signal line and a signal line for illegally acquiring the position data is to be attached to the position-data signal line, the breakage detection circuit is disconnected or short-circuited to detect that a fraud is being committed. Therefore, illegal acquisition of the position data can be effectively prevented by executing the predetermined processing when a fraud was committed.

In this aspect, when the control portion recognizes that a fraud was committed on the basis of the detection result of the fraud detection mechanism, after transmitting notification data notifying occurrence of the fraud to a higher-level control portion controlling a higher-level device on which the input device is mounted, it is preferable to perform at least either one of bringing the control board into an unusable state and erasing the data stored in the control portion. By configuring as above, the notification data notifying the occurrence of the fraud is transmitted to the higher-level control portion before the control board is brought into the unusable state or the data stored in the control portion is erased and thus, the higher-level control portion can recognize that the fraud was committed in the input device.

In this aspect, it is preferable that the notification data includes data for identifying an occurrence spot of the fraud. By configuring as above, the higher-level control portion can identify at which spot of the input device the fraud was committed.

In this aspect, it is preferable that the image displayed on the display surface is an image of a keypad including a plurality of numeric keys, and the control portion changes arrangement of the keys in the image of the keypad displayed on the display surface each time, or changes a size of keys in the image of the keypad displayed on the display surface each time. In other words, in this aspect, it is preferable that the arrangement of the keys on the keypad displayed as an aerial image in the aerial-image display region is changed each time, or the size of the keys on the keypad displayed as an aerial image in the aerial-image display region is changed each time.

By configuring as above, the position of the user's fingertip can be changed each time when the user points at the same numeric key on the keypad displayed in the aerial-image display region with the fingertip. Therefore, even if the position of the user's fingertip can be identified, it becomes possible to make at which numeric key on the keypad the user's fingertip is pointing unknown. Thus, even if the input operation of the information such as a PIN or the like is peeked by a person other than the user inputting the information such as the PIN, for example, it becomes possible to prevent illegal acquisition of this information by the person.

The input device of this aspect can be used, for example, in an information processing device including a card-data reading mechanism reading data recorded in a card, and the card-data reading mechanism is electrically connected to the control portion. This information processing device can secure a high level of security for the input devices. In addition, since the card-data reading mechanism is electrically connected to the control portion of the input device in this information processing device, the card-data reading mechanism can be managed together by the control portion of the input device.

In this aspect, the information processing device includes, for example, as a card-data reading mechanism, at least any one of a magnetic head reading magnetic data recorded in a card, an integrated circuit (IC) contact block having a plurality of IC contact springs that contact an external connection terminal of an IC chip formed on the card, and an antenna communicating information with the card in a non-contact manner.

In this aspect, the information processing device has, for example, a camera for acquiring a face image for facial authentication of a user, and the camera is electrically connected to the control portion. In this case, the cameras can be managed together by the control portion of the input device.

Effect of the Invention

As described above, in the present invention, in an input device for a user to input information such as a PIN or the like using an aerial image displayed in the aerial-image display region, high-level security of the input device can be secured.

MODE FOR CARRYING OUT THE INVENTION

In the following, embodiments of the present invention will be explained with reference to the drawings.

Entire Configuration of Input Device and Information Processing Device

Figure 1:
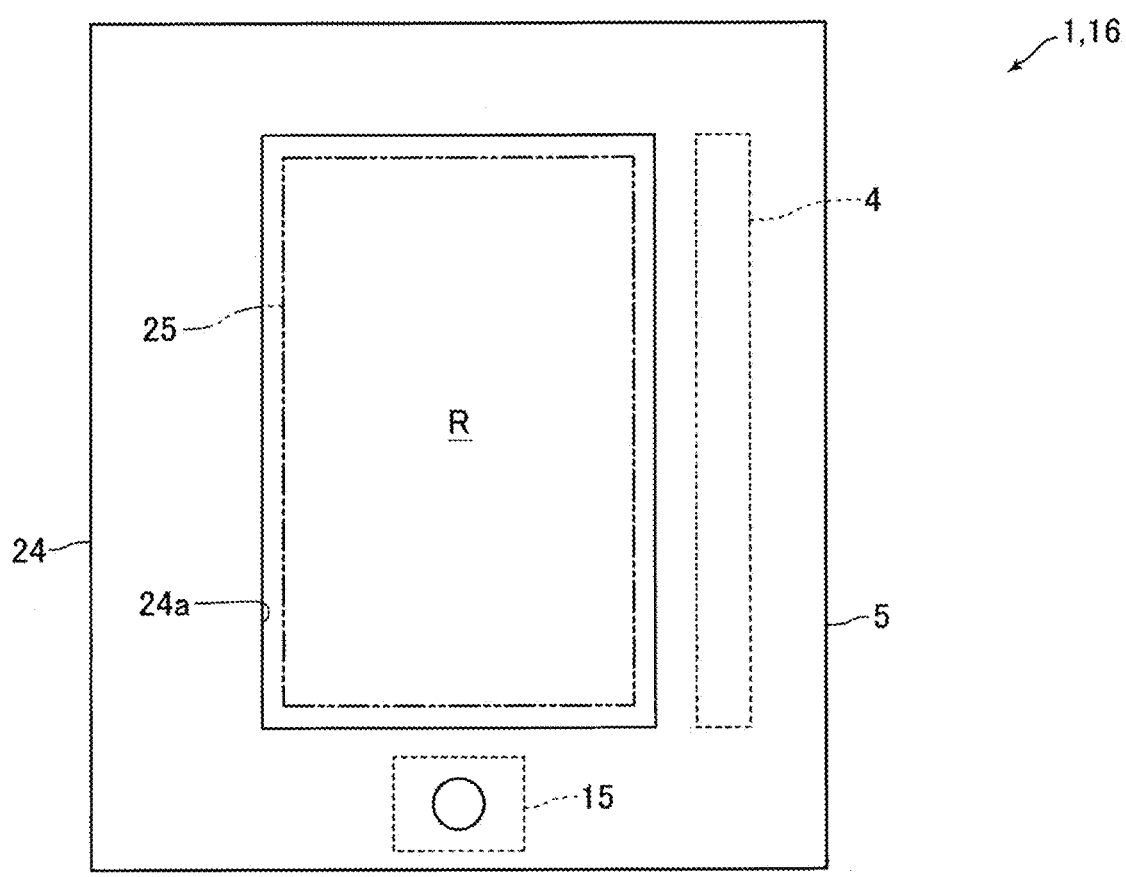
FIG. 1 is a schematic diagram for explaining a configuration of an information processing device according to an embodiment of the present invention.
Figure 2:
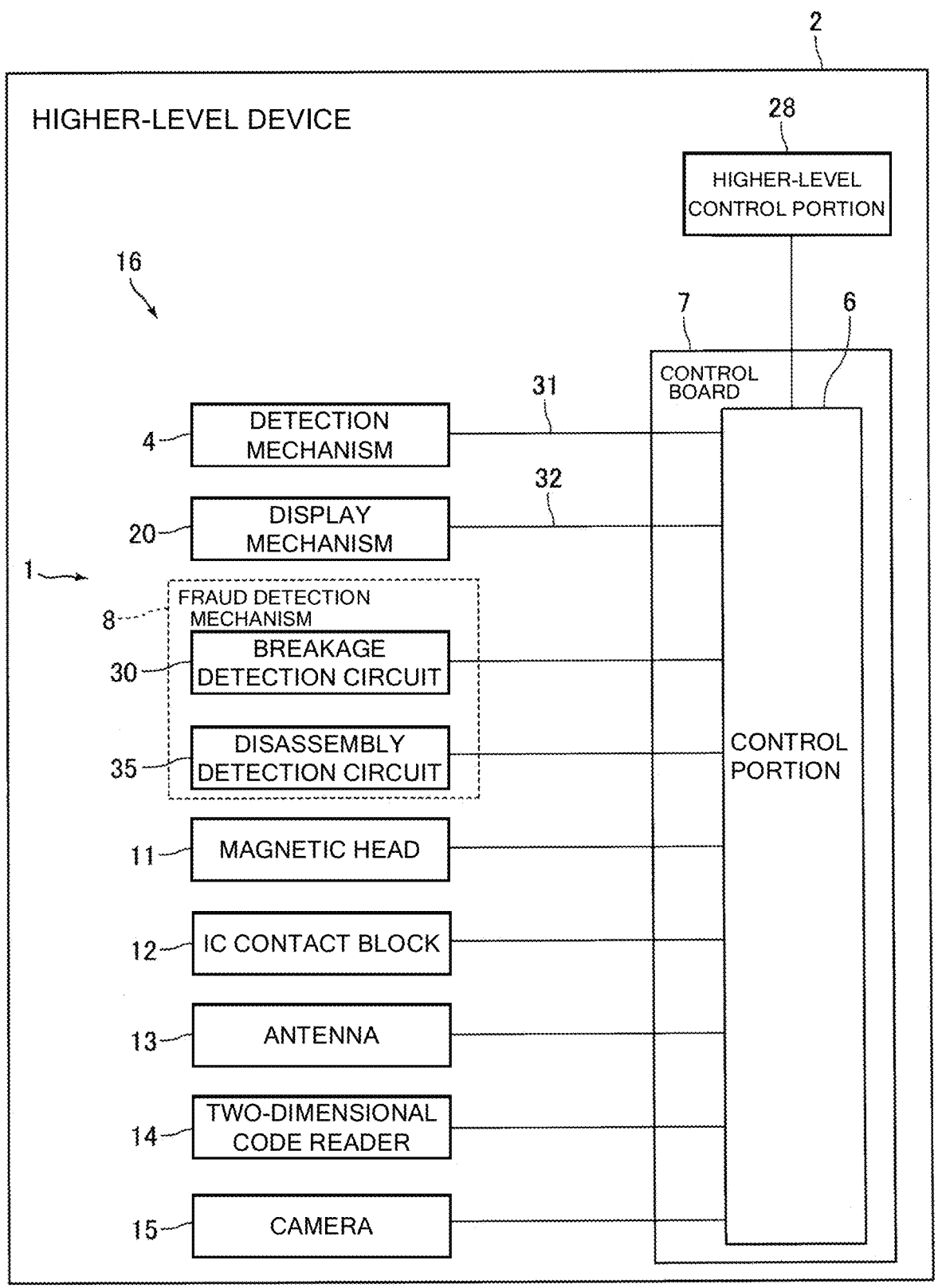
FIG. 2 is a block diagram for explaining a configuration of the information processing device shown in FIG. 1.
Figure 3:
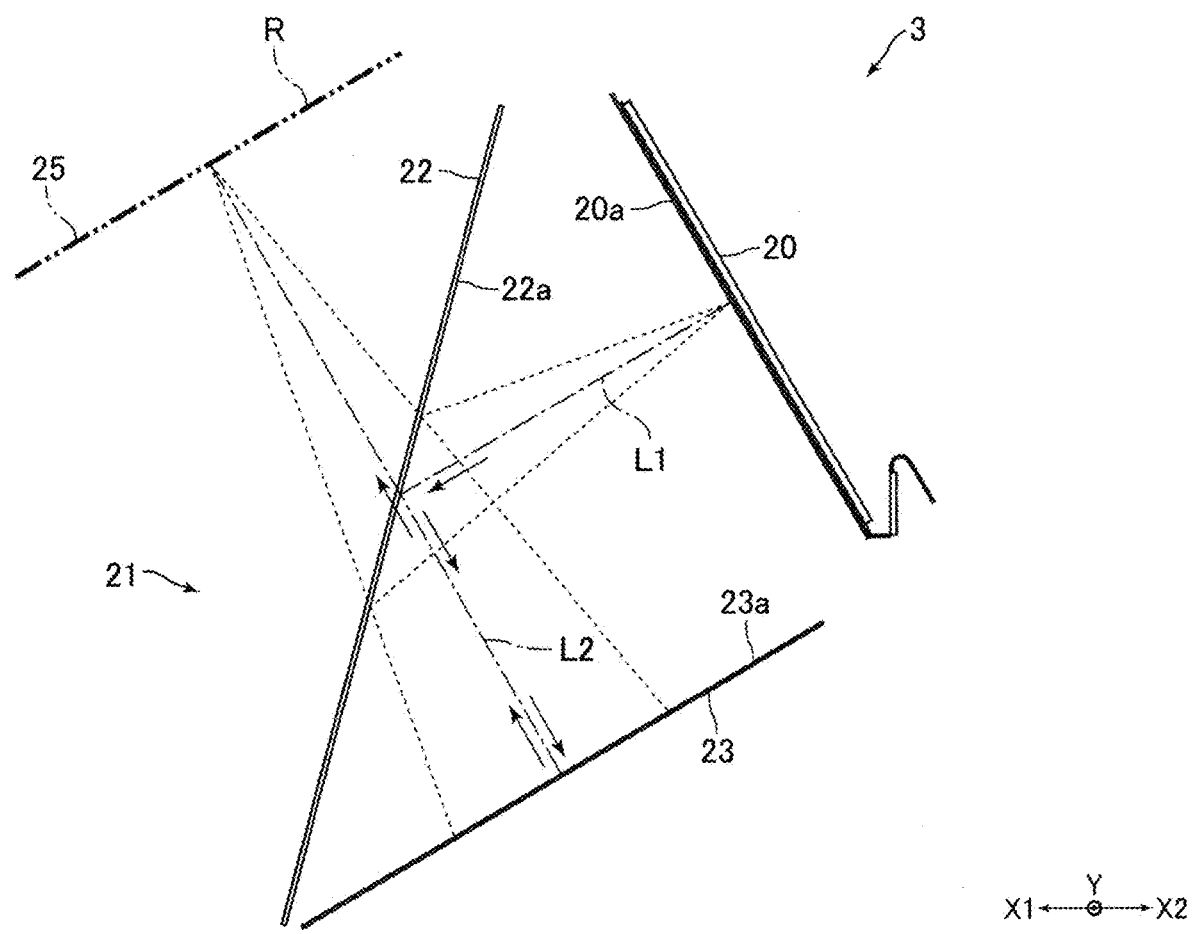
FIG. 3 is a schematic diagram for explaining a configuration of an aerial-image display device used in the input device shown in FIG. 1.
Figure 4:
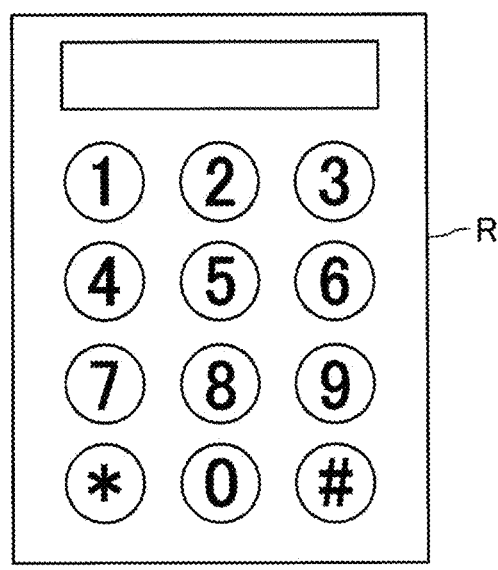
FIG. 4 is a diagram illustrating an example of an aerial image displayed in an aerial-image display region shown in FIG. 1.
Figure 5A:
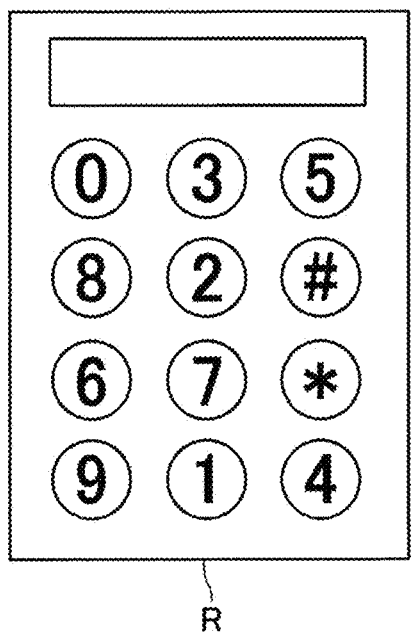
FIG. 5A and FIG. 5B are diagrams for explaining a display method of an aerial image according to another embodiment of the present invention.
Figure 5B:
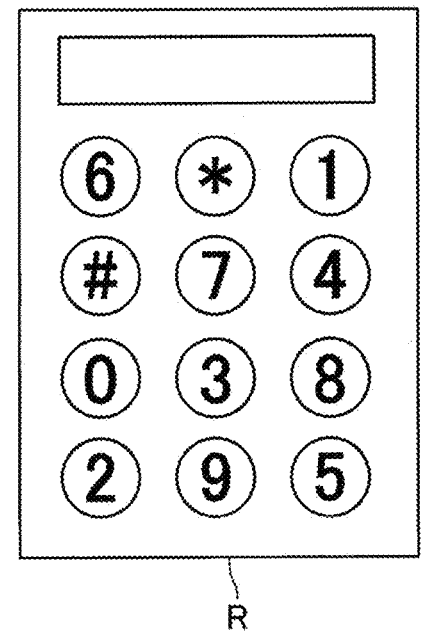
Figure 6A:
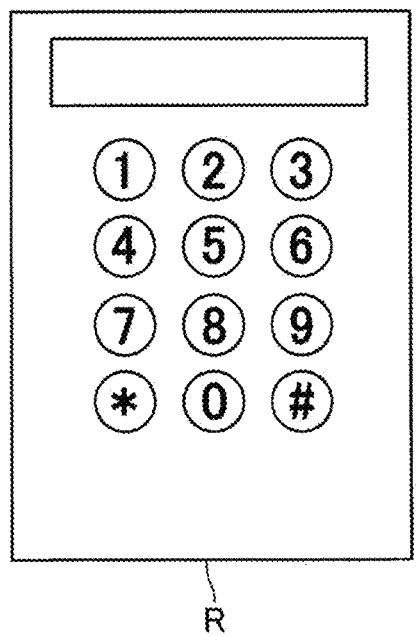
FIG. 6A and FIG. 6B are diagrams for explaining a display method of an aerial image according to another embodiment of the present invention.
Figure 6B:
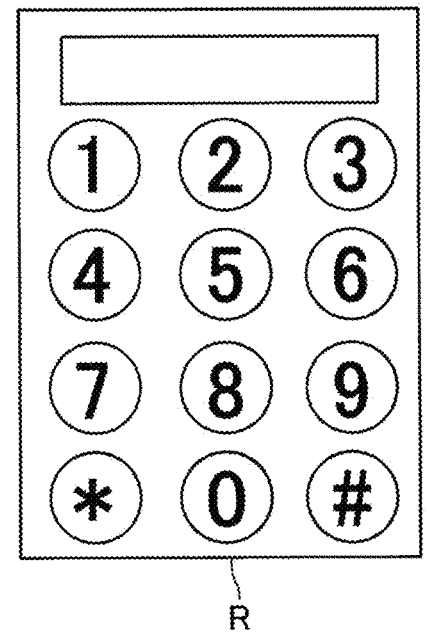

FIG. 1 is a schematic diagram for explaining a configuration of an information processing device 16 according to an embodiment of the present invention. FIG. 2 is a block diagram for explaining a configuration of the information processing device 16 shown in FIG. 1. FIG. 3 is a schematic diagram for explaining a configuration of an aerial-image display device 3 used in an input device 1 shown in FIG. 1. FIG. 4 is a diagram illustrating an example of an aerial image displayed in an aerial-image display region R shown in FIG. 1.

The input device 1 in this embodiment is a device inputting information using a user's fingertips and is used by being mounted on, for example, a higher-level device 2 such as ATMs, authentication devices for credit card and other payments, automatic ticketing machines, vending machines, or an access control device. In the input device 1 of this embodiment a PIN is input. The input device 1 has an aerial-image display device 3 which displays an aerial image in a three-dimensional space, a detection mechanism 4 for detecting a position of the user's fingertip in the aerial-image display region R, which is a region in which the aerial image is displayed, and an enclosure 5 in which the aerial-image display device 3 and the detection mechanism 4 are accommodated.

In addition, the input device 1 includes a control board (control board) 7 having a control portion 6 for controlling the input device 1 and a fraud detection mechanism 8 for detecting that a fraud was committed against the input device 1. In the enclosure 5, a magnetic head 11 for reading magnetic data recorded in a card, an IC contact block 12 having a plurality of IC contact springs which contact external connection terminals of an IC chip formed on the card, and an antenna 13 for communicating information with the card in a non-contact manner are accommodated. The magnetic head 11, the IC contact block 12, and the antenna 13 in this embodiment are a card-data reading mechanism reading data recorded in the card.

Moreover, in the enclosure 5, a two-dimensional code reader 14 for reading two-dimensional codes such as a QR code (registered trademark) and a camera 15 for acquiring face images for facial authentication of users are accommodated. In this embodiment, the information processing device 16 is configured by the input device 1, the magnetic head 11, the IC contact block 12, the antenna 13, the two-dimensional code reader 14, the camera 15 and the like. The information processing device 16 is mounted on the higher-level device 2.

The aerial-image display device 3 as a display mechanism 20 having a display surface 20a for displaying images and an aerial-image forming mechanism 21 which projects the image displayed on the display surface 20a into a space so as to form an image as an aerial image. The aerial-image forming mechanism 21 has a beam splitter 22 and a retroreflective material 23. In the following explanation, a Y-direction in FIG. 3, which is orthogonal to an up-down direction (vertical direction), is referred to as a left-right direction, and a direction orthogonal to the up-down direction and the left-right direction is referred to as a front-back direction. In addition, an X1-direction side in FIG. 3, which is one side in the front-back direction, is assumed to be a "front" side, and an X2-direction side in FIG. 3, which is a side opposite to that, is assumed to be a "rear" side. In this embodiment, a user standing on a front side of the input device 1 performs a predetermined operation on a front surface side of the input device 1.

The display mechanism 20 is, for example, a liquid crystal display or an organic EL display, and the display surface 20a is a display screen. The display surface 20a faces diagonally forward and downward. The beam splitter 22 is formed having a flat plate shape. The beam splitter 22 is disposed on the front side of the display mechanism 20. The beam splitter 22 reflects a part of light emitted from the display surface 20a. That is, a surface on one side of the beam splitter 22 is a reflective surface 22a which reflects a part of the light emitted from the display surface 20a. The reflective surface 22a faces diagonally rearward and downward.

The retroreflective material 23 is formed having a flat plate shape. The retroreflective material 23 is disposed on a lower side of the display mechanism 20 and is disposed on a rear side of the beam splitter 22. To the retroreflective material 23, the light reflected by the beam splitter 22 is incident. The retroreflective material 23 reflects the incident light in the same direction as an incident direction toward the beam splitter 22. In other words, a surface on one side of the retroreflective material 23 is a retroreflective surface 23a, to which the light reflected by the beam splitter 22 is incident and which reflects the incident light in the same direction as the incident direction toward the beam splitter 22. A quarter-wavelength plate is attached to the retroreflective surface 23a. The retroreflective surface 23a faces diagonally forward and upward.

A part of the light emitted from the display surface 20a of the display mechanism 20 is reflected by the reflective surface 22a of the beam splitter 22 and enters the retroreflective surface 23a of the retroreflective material 23. The light reflected by the reflective surface 22a is directed diagonally rearward and downward. The light incident to the retroreflective surface 23a is reflected in the same direction as the incident direction of the light to the retroreflective surface 23a. The light reflected by the retroreflective surface 23a goes diagonally forward and upward and passes through the beam splitter 22. In this embodiment, an optical axis L1 of the light emitted from the display surface 20a and an optical axis L2 of the light reflected by the beam splitter 22 are orthogonal. Moreover, the optical axis of the light reflected by the retroreflective material 23 matches the optical axis L2.

The light transmitted through the beam splitter 22 forms an aerial image in the aerial-image display region R. The aerial-image display region R is disposed on a diagonally upper front side of the beam splitter 22. The aerial image formed in the aerial-image display region R is recognized by a user standing in front of the input device 1 as an image inclined downward as it moves toward the front side.

The enclosure 5 is formed, for example, having a cuboid box shape. The enclosure 5 has a slit groove (not shown) formed through which the card is passed when the magnetic data of the card is read. When magnetic data on the card is to be read, the user manually moves the card along the slit groove. Moreover, the enclosure 5 has a card insertion hole (not shown) formed into which the card is inserted when data is communicated by bringing the IC contact spring of the IC contact block 12 in contact with the external connection terminal of the card. When the data is to be communicated by bringing the IC contact spring of the IC contact block 12 into contact with the external connection terminal of the card, the user manually inserts the card into the card insertion hole.

The enclosure 5 includes a frame body 24 that surrounds the aerial-image display region R. The frame body 24 is formed having a rectangular or regular-square frame shape and is formed having a flat plate shape. The frame body 24 constitutes a surface on an upper front side of the enclosure 5. The frame body 24, which is formed having a flat plate shape, is inclined downward as it goes toward the front side. An inner peripheral side of the frame body 24 is an opening portion 24a that leads to an inside of the enclosure 5. The opening portion 24a is formed having a rectangular or regular-square shape. The aerial-image display region R is formed in the opening portion 24a. The aerial-image display region R serves as an input portion 25 for the user to input information using the fingertips.

The detection mechanism 4 detects a position of the user's fingertip in the aerial-image display region R, as described above. In other words, the input portion 25 is included in a detection range of the detection mechanism 4. The detection mechanism 4 is an optical sensor. Specifically, the detection mechanism 4 is an infrared sensor. In addition, the detection mechanism 4 is a line sensor. The detection mechanism 4 includes a plurality of light emitting portions which emit infrared light and a plurality of light receiving portions to which the infrared light emitted from the light emitting portions and reflected by the user's fingertip is incident, and a board on which the plurality of the light emitting portions and light receiving portions are mounted. In other words, the detection mechanism 4 is a reflective optical sensor.

The detection mechanism 4 is mounted on the enclosure 5. The detection mechanism 4 is disposed on the side of the opening portion 24a. The detection mechanism 4 detects the position of the user's fingertip in a plane containing the aerial-image display region R (that is, in the plane containing the input portion 25). A CPU (Central Processing Unit) is mounted on the board on which the plurality of light emitting portions and light receiving portions are mounted. The CPU encrypts position data, which is the data of the position of user's fingertip detected by the detection mechanism 4.

The magnetic head 11 is disposed so as to face the slit groove from one side surface of the slit groove formed in the enclosure 5. The magnetic head 11 includes a core, a coil wound around the core, a circuit board to which the coil is electrically connected and the like. The CPU is mounted on the circuit board. This CPU encrypts the magnetic data read from the card. The IC contact block 12 is disposed so as to face the card insertion hole from one side surface of the card insertion hole formed in the enclosure 5. The IC contact block 12 has a spring holding member that holds a plurality of the IC contact springs, a circuit board to which the plurality of IC contact springs are electrically connected and the like. The CPU is mounted on the circuit board. This CPU encrypts the data read from the card by using the IC contact springs.

The antenna 13 is an antenna coil (loop antenna) formed by a coil wound in an annular state. The antenna 13 is mounted on a board which is formed having a rectangular or regular-square frame shape. This board is fixed to a surface on the rear lower side of the frame body 24. Moreover, this board is disposed on an outer peripheral side of the opening portion 24a, and the antenna 13 is disposed on the outer peripheral side of the aerial-image display region R so as to surround the aerial-image display region R. When data is to be communicated by using the antenna 13, the user holds the card over the aerial-image display region R. The two-dimensional code reader 14 includes a two-dimensional code reading portion. The two-dimensional code reader 14, for example, is accommodated in the enclosure 5 so that the two-dimensional code reading portion faces the front side. The camera 15 is disposed on the lower side of the opening portion 24a, for example.

The control board 7 is a rigid board such as a glass epoxy substrate or a flexible printed circuit board. The control board 7 is attached to the enclosure 5. The control portion 6 is mounted on the control board 7. To the control portion 6, the detection mechanism 4, the display mechanism 20, the magnetic head 11, the IC contact block 12, the antenna 13, the two-dimensional code reader 14, and the camera 15 are electrically connected. In this embodiment, these configurations are connected to the control portion 6 in a wired manner. Moreover, the control portion 6 is electrically connected to the higher-level control portion 28 for controlling the higher-level device 2. In this embodiment, the control portion 6 is connected to the higher-level control portion 28 in the wired manner and wirelessly. The control portion 6 encrypts the image data, which is the data of the image to be displayed on the display surface 20a, and transmits it to the display mechanism 20.

As described above, the detection mechanism 4 includes the CPU which encrypts the position data, which is the data of the detected position of the user's fingertip. The detection mechanism 4 encrypts the position data and transmits it to the control portion 6. As described above, the magnetic head 11 includes the CPU which encrypts the magnetic data, and the IC contact block 12 includes the CPU which encrypts the data read from the card using the IC contact spring. The magnetic head 11 and the IC contact block 12 encrypt the data read from the card and transmit it to the control portion 6. Moreover, the two-dimensional code reader 14 and the camera 15 also transmit encrypted data to the control portion 6.

In the information processing device 16, the data recorded in the card is read by the magnetic head 11, the IC contact block 12 or the antenna 13. The read data is transmitted to the control portion 6. Moreover, in the information processing device 16, the PIN is input in the input portion 25. When a PIN is to be input in the input portion 25, the display mechanism 20 displays the keypad for inputting the PIN on the display surface 20a, and the aerial-image forming mechanism 21 displays the keypad displayed on the display surface 20a as an aerial image in the aerial-image display region R (see FIG. 4).

The user inputs the PIN by using the keypad displayed in the aerial-image display region R. Specifically, the user inputs the PIN by sequentially moving the fingertip to a position of a predetermined key (number) on the keypad displayed in the aerial-image display region R. In other words, the user inputs the PIN by sequentially performing an operation of pointing the user's fingertip at a predetermined key on the keypad displayed in the aerial-image display region R (pointing operation).

The control portion 6 recognizes the key (number) that is pointed in the pointing operation on the basis of the detection result of the detection mechanism 4 (that is, the detection result of the position of the user's fingertip). In other words, the control portion 6 recognizes the PIN input in the input portion 25 on the basis of the detection result of the detection mechanism 4. The control portion 6 collates the data of the PIN recognized on the basis of the detection results of the detection mechanism 4 with the data read from the card and transmits a data of a collation result to the higher-level control portion 28.

Configuration of Fraud Detection Mechanism and Processing Details at Fraud Detection The fraud detection mechanism 8 includes a breakage detection circuit 30 for detecting at least either one of disconnection and a short circuit of itself. The fraud detection mechanism 8 in this embodiment includes the breakage detection circuit 30 covering a part or the whole of a position-data signal line 31, which transmits encrypted position data from the detection mechanism 4 to the control portion 6, the breakage detection circuit 30 covering a part or the whole of an image-data signal line 32, which transmits encrypted image data from the control portion 6 to the display mechanism 20, and the breakage detection circuit 30 covering a part or the whole of the control board 7. The breakage detection circuit 30 is configured by a pattern of a single conductor, for example. The breakage detection circuit 30 is electrically connected to the control portion 6.

The breakage detection circuit 30 is formed on a flexible printed circuit board (FPC), for example. When the breakage detection circuit 30 covering the position-data signal line 31 is formed on an FPC, for example, in this FPC, a data signal layer in which the data signal circuit, which is the position-data signal line 31, is formed, and a breakage detection circuit layer in which the breakage detection circuit 30 is formed are laminated through an insulation layer. Similarly, when the breakage detection circuit 30 covering the image-data signal line 32 is formed on the FPC, for example, in this FPC, the data signal layer in which the data signal circuit, which is the image-data signal line 32, is formed, and the breakage detection circuit layer in which the breakage detection circuit 30 is formed are laminated through the insulating layer.

The fraud detection mechanism 8 also includes a disassembly detection mechanism 35 for detecting that the input device 1 has been disassembled. The fraud detection mechanism 8 includes, for example, the disassembly detection mechanism 35 for detecting that the enclosure 5 has been disassembled (for example, that the frame body 24 has been removed). Alternatively, the fraud detection mechanism 8 includes, for example, the disassembly detection mechanism 35 for detecting that the control board 7 has been removed from the enclosure 5. Alternatively, the fraud detection mechanism 8 includes, for example, the disassembly detection mechanism 35 for detecting that the control board 7 has been removed from the enclosure 5 and the disassembly detection mechanism 35 for detecting that the detection mechanism 4 has been removed from the enclosure 5.

The disassembly detection mechanism 35 is electrically connected to the control portion 6. The disassembly detection mechanism 35 includes, for example, a contact-type detection switch having a contact electrode or the like. For example, in a state where the control board 7 is attached to the enclosure 5 or the detection mechanism 4 is attached to the enclosure 5, the contact electrode of the detection switch is pressed by a protruding portion formed on the enclosure 5, and the detection switch is in a conductive state. On the other hand, when the control board 7 or the detection mechanism 4 is removed from the enclosure 5, the contact electrode of the detection switch is no longer pressed by the protruding portion and is brought into a non-conductive state and thus, it is detected that the control board 7 or the detection mechanism 4 has been removed from the enclosure 5.

In this embodiment, if a fraud is committed against the position-data signal line 31, the image-data signal line 32 or the control board 7 such as attaching a signal line for data acquisition to the position-data signal line 31, the image-data signal line 32 or the control board 7 in order to illegally acquire data from the input device 1, the breakage detection circuit 30 is disconnected or short-circuited and thus, it becomes possible to detect the fraud against each of the position-data signal line 31, the image-data signal line 32, and the control board 7 by the breakage detection circuit 30.

Moreover, when the fraud detection mechanism 8 includes the disassembly detection mechanism 35 for detecting that the enclosure 5 has been disassembled, if the enclosure 5 is disassembled in order to illegally acquire the data, the disassembly detection mechanism 35 detects that the enclosure 5 has been disassembled and thus, it is possible to detect the fraud against each of the detection mechanism 4, the control board 7, the display mechanism 20, the position-data signal line 31, and the image-data signal line 32 by the disassembly detection mechanism 35. Moreover, in this case, it is possible to detect the fraud against each of the magnetic head 11 and the IC contact block 12 accommodated in the enclosure 5 by the disassembly detection mechanism 35.

Moreover, when the fraud detection mechanism 8 includes the disassembly detection mechanism 35 for detecting that the control board 7 has been removed from the enclosure 5 and the disassembly detection mechanism 35 for detecting that the detection mechanism 4 has been removed from the enclosure 5, it is possible to detect the fraud against each of the detection mechanism 4 and the control board 7 by the disassembly detection mechanism 35. Moreover, when the fraud detection mechanism 8 includes the disassembly detection mechanism 35 for detecting that the control board 7 has been removed from the enclosure 5, it is possible to detect the fraud against the control board 7 by the disassembly detection mechanism 35.

In other words, in this embodiment, at least a fraud against the control board 7, a fraud against the position-data signal line 31, and a fraud against the image-data signal line 32 can be detected by the fraud detection mechanism 8, and at least the control board 7, the position-data signal line 31, and the image-data signal line 32 can be physically protected. Moreover, if the fraud detection mechanism 8 includes the disassembly detection mechanism 35 for detecting that the enclosure 5 has been disassembled, the detection mechanism 4, the control board 7, the magnetic head 11, the IC contact block 12, the display mechanism 20, the position-data signal line 31, and the image-data signal line 32 can be physically protected.

When the control portion 6 recognizes that a fraud was committed on the basis of the detection result of the fraud detection mechanism 8, it executes predetermined processing. Specifically, when the control portion 6 recognizes that a fraud was committed on the basis of a detection result of the fraud detection mechanism 8, it transmits notification data notifying the higher-level control portion 28 of the occurrence of the fraud. Moreover, after transmitting the notification data to the higher-level control portion 28, the control portion 6 executes at least either one of bringing the control board 7 into an unusable state and erasing the data stored in the control portion 6.

The notification data notified to the higher-level control portion 28 includes data for identifying an occurrence spot of the fraud. For example, if disconnection or a short circuit occurred in the breakage detection circuit 30, the notification data includes data for identifying the breakage detection circuit 30 in which the disconnection or short circuit occurred. Moreover, when the disassembly detection mechanism 35 detects that the input device 1 has been disassembled, the notification data includes data for identifying the disassembly detection mechanism 35 that detected that the input device 1 has been disassembled (that is, data for identifying which part of the input device 1 was removed).

Main Effect of This Embodiment

As explained above, in this embodiment, the control portion 6 encrypts the image data, which is the data of the image displayed on the display surface 20a of the display mechanism 20 and transmits it to the display mechanism 20, and the detection mechanism 4 encrypts and transmits the position data, which is the data of the detected position of the user's fingertip to the control portion 6. Thus, in this embodiment, it becomes possible to prevent illegal acquisition of the image data transmitted from the control portion 6 to the display mechanism 20 and the position data transmitted from the detection mechanism 4 to the control portion 6.

Moreover, in this embodiment, the fraud detection mechanism 8 can detect at least a fraud against the control board 7, a fraud against the position-data signal line 31, and a fraud against the image-data signal line 32, and when a fraud occurs, the control portion 6 executes at least either one of processing of bringing the control board 7 into the unusable state and erasing the data stored in control portion 6. Therefore, in this embodiment, a high level of security compliant with PCIPTS, for example, can be ensured for the input device 1.

In this embodiment, when the control portion 6 recognizes that a fraud has been committed on the basis of the detection result of the fraud detection mechanism 8, it transmits the notification data to the higher-level control portion 28 notifying the occurrence of the fraud before the control board 7 is brought into an unusable state or the data stored in the control portion 6 is erased. Thus, in this embodiment, the higher-level control portion 28 can recognize that a fraud has been committed in the input device 1. In this embodiment, the notification data includes the data for identifying the occurrence spot of the fraud and thus, the higher-level control portion 28 can identify at which part of the input device 1 the fraud was committed.

In this embodiment, the magnetic head 11, the IC contact block 12, the antenna 13, the two-dimensional code reader 14, and the camera 15 are electrically connected to the control portion 6 of the input device 1. Thus, in this embodiment, the magnetic head 11, the IC contact block 12, the antenna 13, the two-dimensional code reader 14, and the camera 15 can be managed together by the control portion 6 of the input device 1. Therefore, in this embodiment, the processing in the higher-level control portion 28 can be simplified.

Example of Changing Display Method of Aerial Image FIG. 5A-FIG. 5B and FIG. 6A-FIG. 6B are diagrams for explaining a display method of an aerial image according to another embodiment of the present invention.

In the embodiment described above, the control portion 6 may change the key arrangement of the keypad image displayed on the display surface 20a of the display mechanism 20 each time. In other words, the key arrangement of the keypad displayed as an aerial image in the aerial-image display region R may be changed each time. In this case, for example, the key arrangement of the keypad shown in FIG. 4 is changed to the arrangement shown in FIG. 5A or FIG. 5B. Moreover, the control portion 6 may change a size of the keys on the image of the keypad displayed on the display surface 20a each time. In other words, the size of the keys on the keypad displayed as an aerial image in the aerial-image display region R may be changed each time. In this case, for example, the size of the keys on the keypad shown in FIG. 4 is changed to the size shown in FIG. 6A or FIG. 6B.

In these cases, it is possible to change the position of the user's fingertip each time the user points at the same numeric key on the keypad displayed in the aerial-image display region R with the fingertip. Thus, even if the position of the user's fingertip can be identified, it becomes possible to make at which numeric key on the keypad the user's fingertip is pointing unknown. Therefore, in this modified example, even if the input operation of the PIN is peeked by a person other than the user inputting the PIN, for example, it is possible to prevent illegal acquisition of this information by others.

Other Embodiments

The embodiment described above is an example of a preferred embodiment of the present invention, but it is not limiting, and various modifications can be made within a range not changing the gist of the present invention.

In the embodiment described above, the fraud detection mechanism 8 does not have to include the disassembly detection mechanism 35. In this case, the fraud detection mechanism 8 does not have to include the breakage detection circuit 30 covering the image-data signal line 32. If the fraud detection mechanism 8 does not include the breakage detection circuit 30 covering the image-data signal line 32 and the disassembly detection mechanism 35, a fraud against the control board 7 and a fraud against the position-data signal line 31 can be detected by the fraud detection mechanism 8.

In the embodiment described above, if the fraud detection mechanism 8 includes the disassembly detection mechanism 35 for detecting that the enclosure 5 has been disassembled, the fraud detection mechanism 8 does not have to include the breakage detection circuit 30. Moreover, in the embodiment described above, the notification data transmitted to the higher-level control portion 28 does not have to include data for identifying the occurrence spot of the fraud. Furthermore, in the embodiment described above, the control portion 6 does not have to transmit the notification data to the higher-level control portion 28.

In the embodiment described above, the fraud detection mechanism 8 may include the breakage detection circuit 30 covering a part or the whole of the magnetic head 11, the breakage detection circuit 30 covering a part or the whole of the IC contact block 12, the breakage detection circuit 30 covering a part or the whole of the data signal line transmitting the encrypted magnetic data from the magnetic head 11 to the control portion 6, and the breakage detection circuit 30 covering a part or the whole of the data signal line transmitting the encrypted data from the IC contact block 12 to the control portion 6.

In the embodiment described above, the user may input the information other than the PIN by using the image of the keypad displayed in the aerial-image display region R. Moreover, in the embodiment described above, the user may input the PIN by performing an operation of tracing a predetermined position in the frame displayed in the aerial-image display region R with a fingertip. In this case, the keypad image is not displayed in the aerial-image display region R. Even in this case, the control portion 6 recognizes the PIN input in the input portion 25 on the basis of the detection result of the detection mechanism 4. Moreover, in the embodiment described above, in addition to or instead of the PIN, the user's signature (signature) may be input in the input portion 25. In this case, the user inputs the signature by, for example, moving the fingertip within a frame displayed in the aerial-image display region R.

In the embodiment described above, the detection mechanism 4 may be a transmissive optical sensor having a plurality of light emitting portions which emit infrared light and a plurality of light receiving portions to which the infrared light emitted from the light emitting portions is incident. In this case, the detection mechanism 4 is configured by a first detection mechanism having the light emitting portion and the light receiving portion disposed to sandwich the aerial-image display region R in the left-right direction, and a second detection mechanism having the light-emitting portion and the light receiving portion disposed to sandwich the aerial-image display region R in a direction orthogonal to the optical axis L2 and orthogonal to the left-right direction. Moreover, in the embodiment described above, the detection mechanism 4 may be a capacitance sensor or may be a motion sensor. In addition, the detection mechanism 4 may be constituted by two cameras.

In the embodiment described above, contactless communication of information with the information processing device 16 by using the antenna 13 may be performed by an information recording medium other than the card or an electronic device such as a smartphone. Furthermore, in the embodiment described above, the information processing device 16 does not have to include the two-dimensional code reader 14. In this case, the two-dimensional code may be read by the camera 15. Moreover, in the embodiment described above, the information processing device 16 does not have to include the camera 15. Moreover, the information processing device 16 does not have to include at least any one of the magnetic head 11, the IC contact block 12, and the antenna 13.

DESCRIPTION OF REFERENCE NUMERALS

1 Input device
2 Higher-level device
4 Detection mechanism
6 Control portion
7 Control board
8 Fraud detection mechanism
11 Magnetic head (card-data reading mechanism)
12 IC contact block (card-data reading mechanism)
13 Antenna (card-data reading mechanism)
15 Camera
20 Display mechanism
20a Display surface
21 Aerial-image forming mechanism
25 Input portion
28 Higher-level control portion
30 Breakage detection circuit
31 Position-data signal line
R Aerial-image display region

The invention claimed is:

1. An input device inputting information by using a user's fingertip, the input device comprising:
a display mechanism having a display surface which displays an image, an aerial-image forming mechanism which projects the image displayed on the display surface into a space to form an image as an aerial image, a detection mechanism detecting a position of the user's fingertip in an aerial-image display region, which is a region in which the aerial image is displayed, a control board having a control portion controlling the input device, and a fraud detection mechanism detecting that a fraud was committed against the input device, wherein the aerial-image display region is an input portion inputting information;
the control portion encrypts image data, which is data of the image displayed on the display surface, and transmits the encrypted image data to the display mechanism;
the detection mechanism encrypts position data, which is data of a detected position of the user's fingertip, and transmits the encrypted position data to the control portion; and
at least a fraud against a position-data signal line which transmits the encrypted position data from the detection mechanism to the control board and a fraud against the control board is detected by the fraud detection mechanism.

2. The input device according to claim 1, wherein
the fraud detection mechanism includes a breakage detection circuit for detecting at least either one of disconnection and a short circuit of itself; and
the breakage detection circuit covers at least a part of the position-data signal line.

3. The input device according to claim 1, wherein
when the control portion recognizes that a fraud was committed based on a detection result of the fraud detection mechanism, after transmitting notification data notifying occurrence of the fraud to a higher-level control portion controlling a higher-level device on which the input device is mounted, the control portion performs at least either one of bringing the control board into an unusable state and erasing data stored in the control portion.

4. The input device according to claim 3, wherein
the notification data includes data for identifying an occurrence spot of the fraud.

5. The input device according to claim 1, wherein
the image displayed on the display surface is an image of a keypad including a plurality of numeric keys; and
the control portion changes arrangement of the numeric keys on the image of the keypad displayed on the display surface each time or changes a size of the numeric keys on the image of the keypad displayed on the display surface each time.

6. An information processing device, comprising:
the input device according to claim 1 and a card data reading mechanism reading data recorded in a card, wherein
the card data reading mechanism is electrically connected to the control portion.

7. The information processing device according to claim 6, wherein
as the card data reading mechanism, at least any one of a magnetic head reading magnetic data recorded in a card, an integrated circuit (IC) contact block having a plurality of IC contact springs that contact an external connection terminal of an IC chip formed on the card, and an antenna communicating information with the card in a non-contact manner.

8. The information processing device according to claim 6, further comprising:
a camera for acquiring a face image for facial authentication of the user, wherein
the camera is electrically connected to the control portion.

* * * * *